(12) United States Patent
Li et al.

(10) Patent No.: US 9,866,169 B1
(45) Date of Patent: Jan. 9, 2018

(54) PHOTOVOLTAIC JUNCTION BOX WITH NON-ZERO ANGLE BETWEEN DIODES

(71) Applicant: Tyco Electronics (Shanghai) Co. Ltd., Shanghai (CN)

(72) Inventors: Cui Li, Shanghai (CN); Yuan Zhong, Shanghai (CN); Xiang Xu, Shanghai (CN); Wenbo Lv, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/248,030

(22) Filed: Aug. 26, 2016

(30) Foreign Application Priority Data

Aug. 26, 2015 (CN) .......................... 2015 2 0650930

(51) Int. Cl.
  *H02S 40/34* (2014.01)
  *H02G 3/03* (2006.01)
  *H02G 3/08* (2006.01)

(52) U.S. Cl.
  CPC ............. *H02S 40/345* (2014.12); *H02G 3/03* (2013.01); *H02G 3/081* (2013.01)

(58) Field of Classification Search
  None
  See application file for complete search history.

(56) References Cited

U.S. PATENT DOCUMENTS

| | | | | |
|---|---|---|---|---|
| 2004/0177987 A1* | 9/2004 | Yoshikawa | .......... | H01R 9/2425 174/59 |
| 2005/0197001 A1* | 9/2005 | Higashikozono | ........ | H01R 9/16 439/485 |
| 2008/0011348 A1* | 1/2008 | Aoyama | .............. | H01R 9/2425 136/244 |
| 2012/0081857 A1* | 4/2012 | Nakazono | ............. | H02S 40/345 361/714 |
| 2012/0224339 A1* | 9/2012 | Yoshikawa | ............. | H02S 40/34 361/752 |
| 2012/0248594 A1* | 10/2012 | Lee | ........................ | H01L 23/291 257/693 |
| 2012/0298189 A1* | 11/2012 | Sasakura | .................. | H02G 3/16 136/251 |

\* cited by examiner

*Primary Examiner* — Dimary Lopez Cruz
*Assistant Examiner* — Muhammed Azam
(74) *Attorney, Agent, or Firm* — Barley Snyder

(57) ABSTRACT

A photovoltaic junction box comprises a body having a first end and a second end opposite to each other in a lengthwise direction thereof, and a first side and a second side opposite to each other in a widthwise direction thereof, a plurality of conduction terminals disposed in the body, and a plurality of diodes each having an anode pin and a cathode pad respectively soldered on two adjacent conduction terminals. An angle between two adjacent diodes of the plurality of diodes is not equal to zero.

20 Claims, 2 Drawing Sheets

US 9,866,169 B1

PHOTOVOLTAIC JUNCTION BOX WITH NON-ZERO ANGLE BETWEEN DIODES

CROSS-REFERENCE TO RELATED APPLICATION

This application claims the benefit of the filing date under 35 U.S.C. §119(a)-(d) of Chinese Patent Application No. 201520650930.1 filed on Aug. 26, 2015.

FIELD OF THE INVENTION

The present invention relates to a photovoltaic junction box, and more particularly, to a photovoltaic junction box capable of being mounted on a solar panel.

BACKGROUND

Solar panels collect solar energy and transform the collected solar energy into electrical energy. When a shadow is produced on the solar panel, such as from a cloud or leaves, cells of the solar panel that are not in the shade tend to overheat. A diode in a photovoltaic junction box mounted on the solar panel acts as a bypass to limit damage from overheating.

Known photovoltaic junction boxes are electrically connected with a bus bar of the solar panel and have a plurality of conductive terminals and a plurality of diodes soldered on the conduction terminals. An anode and a cathode of each diode are soldered on a pair of adjacent conduction terminals, respectively. In operation, the diode will produce heat, and the produced heat will be transferred to the conduction terminals.

Opposite edges of adjacent conduction terminals are parallel to each other and substantially perpendicular to a lengthwise direction of the solar junction box. The anode and the cathode of the diode are soldered on areas in the vicinity of the edges of the adjacent conduction terminals, and thus, diodes within known photovoltaic junction boxes are consistently arranged in a direction parallel to the lengthwise direction of the junction box. Such a known arrangement of the diodes, however, unevenly distributes the heat produced by the diodes within the photovoltaic junction box. The current-carrying capacity of the photovoltaic junction box consequently decreases, and furthermore, the heat produced by the diodes does not dissipate quickly, deteriorating or damaging the diode over time.

SUMMARY

An object of the invention, among others, is to provide a photovoltaic junction box in which heat produced by diodes is distributed more evenly within the photovoltaic junction box. The disclosed photovoltaic junction box comprises a body having a first end and a second end opposite to each other in a lengthwise direction thereof, and a first side and a second side opposite to each other in a widthwise direction thereof, a plurality of conduction terminals disposed in the body, and a plurality of diodes each having an anode pin and a cathode pad respectively soldered on two adjacent conduction terminals. An angle between two adjacent diodes of the plurality of diodes is not equal to zero.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a photovoltaic junction box. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
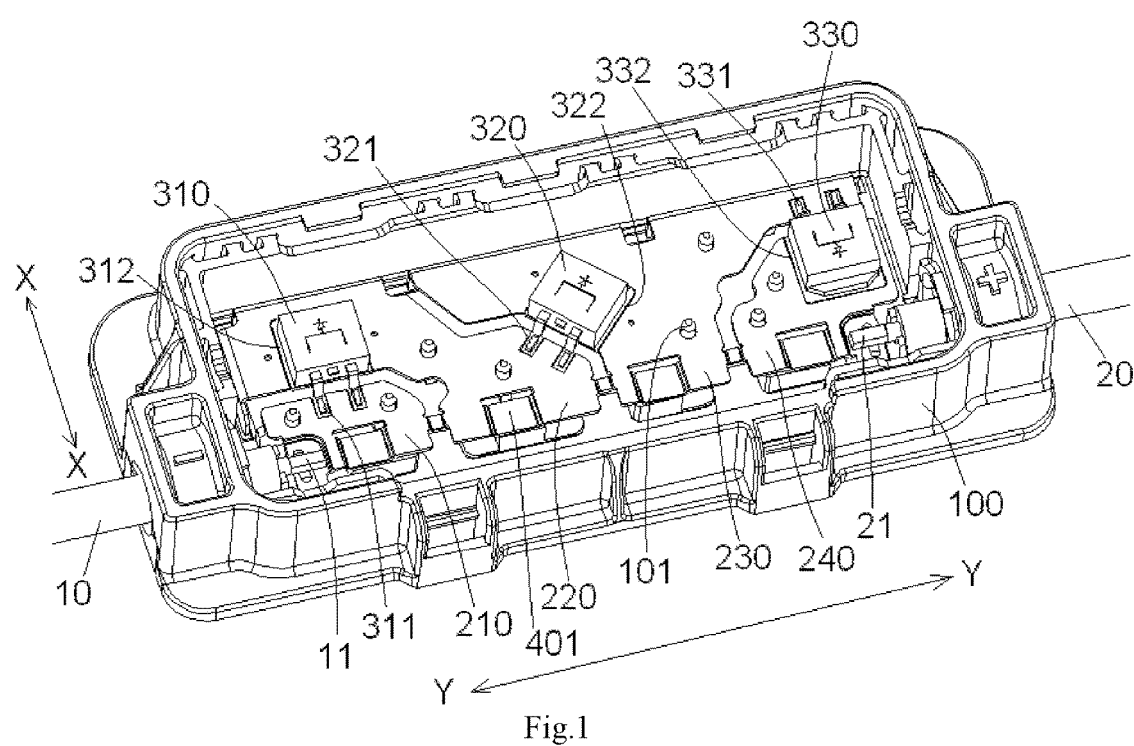
FIG. 1 is a perspective view of a photovoltaic junction box according to the invention.
Figure 2:
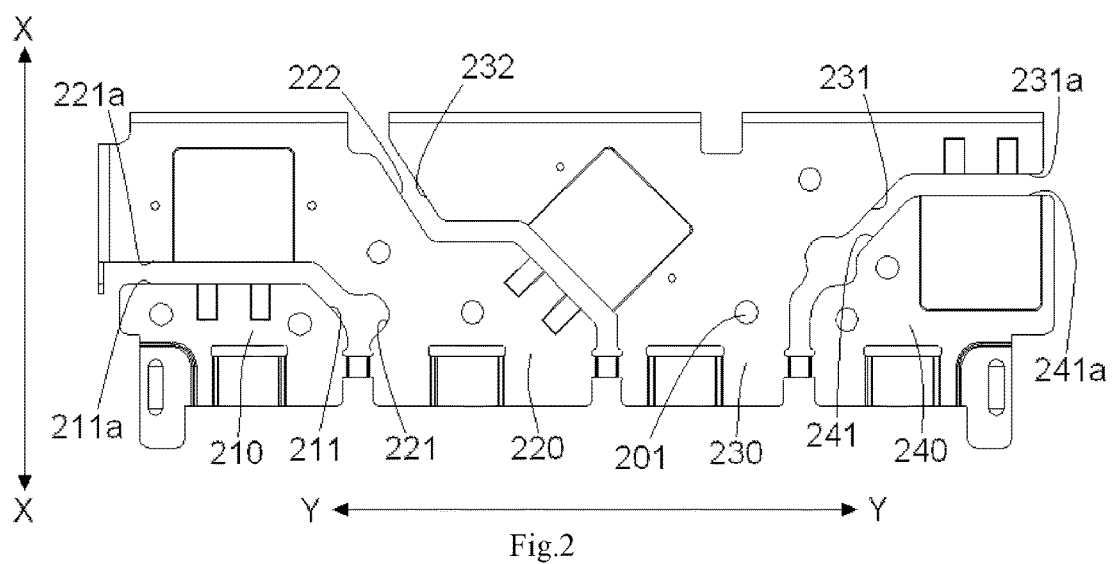
FIG. 2 is a schematic plan view of conduction terminals and diodes of the photovoltaic junction box of FIG. 1.

A photovoltaic junction box according to the invention is shown generally in FIGS. 1 and 2. The photovoltaic junction box has a body 100, a plurality of conduction terminals 210, 220, 230, and 240, and a plurality of diodes 310, 320, and 330. The major components of the invention will now be described in greater detail.

The body 100, as shown in FIG. 1, has a first end and an opposite second end in a lengthwise direction Y, and a first side and an opposite second side in a widthwise direction X.

The plurality of conduction terminals 210, 220, 230 and 240 are sequentially placed on a bottom of a receiving chamber of the body 100 from the first end to the second end of the body 100, as shown in FIGS. 1 and 2. In the embodiment shown in FIGS. 1 and 2, the photovoltaic junction box has a first conduction terminal 210, a second conduction terminal 220, a third conduction terminal 230 and a fourth conduction terminal 240 arranged sequentially from the first end to the second end.

As shown in FIG. 2, each of conduction terminals 210, 220, 230 and 240 is formed with a plurality of positioning holes 201. A bottom wall of an internal portion of the body 100 is formed with a plurality of positioning stubs 101 as shown in FIG. 1, which are engaged with the positioning holes 201 so as to position and fix the conduction terminals 210, 220, 230 and 240.

As shown in FIG. 2, the first edge 221 of the second conduction terminal 220 extends from the first side to the first end of the body 100 along a curving path. The first conduction terminal 210 is disposed within an area defined by the first edge 221 of the second conduction terminal 220, and the first side and the first end of the body 100. The first conduction terminal 210 has a first edge 211 facing the second conduction terminal 220, and the second conduction terminal 220 has a first edge 221 facing the first conduction terminal 210. The first edge 211 of the first conduction terminal 210 has a first edge segment 211a extending toward the first end of the body 100, and the first edge 221 of the second conduction terminal 220 has a first edge segment 221a extending toward the first end of the body 100. The first edge segment 211a of the first conduction terminal 210 and the first edge segment 221a of the second conduction terminal 220 are arranged opposite each other in the widthwise direction X of the body 100.

The first edge 231 of the third conduction terminal 230 extends from the first side to the second end of the body 100 along a curving path. The fourth conduction terminal 240 is disposed within an area defined by the first edge 231 of the third conduction terminal 230, and the first side and the second end of the body 100. The fourth conduction terminal 240 has a first edge 241 facing the third conduction terminal 230, and the third conduction terminal 230 has a first edge 231 facing the fourth conduction terminal 240. The first edge 241 of the fourth conduction terminal 240 has a first edge segment 241a extending toward the second end of the body 100, and the first edge 231 of the third conduction terminal 230 has a first edge segment 231a extending toward the second end of the body 100. The first edge segment 241a of the fourth conduction terminal 240 and the first edge segment 231a of the third conduction terminal 230 are arranged opposite each other in the widthwise direction X of the body 100.

The second conduction terminal 220 has a second edge 222 facing the third conduction terminal 230, and the third conduction terminal 230 has a second edge 232 facing the second conduction terminal 220. The second edge 222 of the second conduction terminal 220 extends from the first side to the second side of the body 100 along a curving path; and the second edge 232 of the third conduction terminal 230 extends from the first side to the second side of the body 100 along a curving path.

In the embodiment shown in FIG. 1, the photovoltaic junction box has three diodes 310, 320, and 330. These three diodes 310, 320 and 330 comprise a first diode 310, a second diode 320, and a third diode 330 arranged sequentially from the first end to the second end of the body 100 as shown in FIG. 1. Each diode 310, 320, and 330 has a flat body, at least one anode pin 311, 321, or 331 extending outwardly from an edge of the flat body, and a cathode pad 312, 322, or 332 located on a bottom of the flat body.

The diodes 310, 320 and 330 are soldered on the conduction terminals 210, 220, 230 and 240 by means of surface-mount technology, by which the diodes 310, 320, and 330 are mounted directly on surfaces of the conduction terminals 210, 220, 230, and 240.

Each diode 310, 320 or 330 is surface-mounted on two adjacent conduction terminals 210, 220; 220, 230; or 230, 240. As shown in FIG. 1, the anode pins 311 and the cathode pad 312 of the first diode 310 are soldered on the first conduction terminal 210 and the second conduction terminal 220 by means of surface-mount technology, respectively; the anode pins 321 and the cathode pad 322 of the second diode 320 are soldered on the second conduction terminal 220 and the third conduction terminal 230, respectively; and the anode pins 331 and the cathode pad 332 of the third diode 330 are soldered on the third conduction terminal 230 and the fourth conduction terminal 240, respectively.

The anode pin 311 of the first diode 310 is soldered on a border area of the first edge segment 211a of the first conduction terminal 210, and the cathode pad 312 of the first diode 310 is soldered on a border area of the first edge segment 221a of the second conduction terminal 220, such that an axis of the first diode 310 is arranged parallel to the widthwise direction X. The anode pin 321 of the second diode 320 is soldered on the second edge 222 of the second conduction terminal 220, and the cathode pad 322 of the second diode 320 is soldered on the second edge 232 of the third conduction terminal 230. The anode pin 331 of the third diode 330 is soldered on a border area of the first edge segment 231a of the third conduction terminal 230, and the cathode pad 332 of the third diode 330 is soldered on a border area of the first edge segment 241a of the fourth conduction terminal 240, such that an axis of the third diode 330 is arranged parallel to the widthwise direction X.

The plurality of diodes 310, 320, 330 are arranged as to be not parallel to the lengthwise direction Y of the body 100. As shown in FIGS. 1 and 2, the first diode 310 is arranged such that the axis thereof has an angle of about 90 degrees with respect to the lengthwise direction Y, the second diode 320 is arranged such that the axis thereof has an angle of about 45 degrees with respect to the lengthwise direction Y, and the third diode 330 is arranged such that the axis thereof has an angle of about 270 degrees with respect to the lengthwise direction Y. An angle between axes of adjacent diodes 310, 320, and 330 is not equal to zero. In the shown embodiment, the first diode 310 has an angle of about 45 degrees with respect to the second diode 320, and the second diode 320 has an angle of about 135 degrees with respect to the third diode 330.

The use of the photovoltaic junction box will now be described in greater detail.

As shown in FIG. 1, a first wire 10 and a second wire 20 are inserted into the photovoltaic junction box. One end of the first wire 10 is introduced into the first end of the body 100, and a conductor 11 of the first wire 10 is electrically connected to the first conduction terminal 210. The conductor 11 of the first wire 10 may be soldered or crimped onto the first conduction terminal 210. One end of the second wire 20 is introduced into the second end of the body 100, and a conductor 21 of the second wire 20 is electrically connected to the fourth conduction terminal 240. The conductor 21 of the second wire 20 may be soldered or crimped onto the fourth conduction terminal 240. As shown in FIG. 1, bus bars 401 provided on a solar panel (not shown) are introduced into the body 100 and soldered to the conduction terminals 210, 220, 230 and 240, respectively.

The heat produced by the diodes 310, 320, and 330 in operation is mainly concentrated on the cathode pad 312, 322, or 332, with some heat originating on the anode pin 311, 321, or 331. The first conduction terminal 210 is soldered with only the anode pin 311, the second conduction terminal 220 is soldered with the anode pin 321 as well as the cathode pad 312, the third conduction terminal 230 is soldered with the anode pin 331 as well as the cathode pad 322, and the fourth conduction terminal 240 is soldered with only the cathode pad 332. Thus, in operation, the heat transmitted to the first conduction terminal 210 is the least, the heat transmitted to the fourth conduction terminal 240 is more than that transmitted to the first conduction terminal 210, and the heat transmitted to the second conduction terminal 220 or the third conduction terminal 230 is more than that transmitted to the fourth conduction terminal 240. Furthermore, since the third conduction terminal 230 is much closer to a central area of the body 100 than the second conduction terminal 220, the heat dissipation performance of the third conduction terminal 230 is poorer than that of the second conduction terminal 220.

In order to optimize the overall heat dissipation efficiency of the photovoltaic junction box, a surface area of the third conduction terminal 230 is larger than that of the second conduction terminal 220, the surface area of the second conduction terminal 220 is larger than that of the fourth conduction terminal 240, and the surface area of the fourth conduction terminal 240 is larger than that of the first conduction terminal 210. Moreover, in order to further improve the overall heat dissipation efficiency of the photovoltaic junction box, the diodes 310, 320, and 330 are mounted at positions such that a distance between two adjacent diodes 310, 320 and 330 is as large as possible. Furthermore, since the directions of axes of two adjacent diodes 310, 320 and 330 are different from each other, the heat produced by the diodes 310, 320 and 330 when working will distribute more evenly in the body 100.

Advantageously, according to the photovoltaic conduction box of the present invention, due to the arrangement of the diodes 310, 320, and 330 and the relative size of the conduction terminals 210, 220, 230, and 240, heat produced by the diodes 310, 320, and 330 in operation will distribute more evenly in the body 100 of the photovoltaic junction box, thereby improving the heat dissipation efficiency and thus the current-carrying capacity of the photovoltaic junction box.

What is claimed is:

1. A photovoltaic junction box adapted to be mounted on a solar panel, comprising:
   a body having a first end and a second end opposite to each other in a lengthwise direction thereof, and a first side and a second side opposite to each other in a widthwise direction thereof;
   a plurality of conduction terminals disposed in the body; and a plurality of diodes each having an anode pin and a cathode pad respectively soldered on two adjacent conduction terminals, an angle between two adjacent diodes of the plurality of diodes not equal to zero.

2. The photovoltaic junction box of claim 1, wherein at least one of the plurality of diodes is not parallel to the lengthwise direction of the body.

3. The photovoltaic junction box of claim 1, wherein the plurality of conduction terminals is sequentially placed on a bottom of a receiving chamber of the body.

4. The photovoltaic junction box of claim 1, wherein
   the plurality of conduction terminals comprise a first conduction terminal, a second conduction terminal, a third conduction terminal and a fourth conduction terminal arranged sequentially from the first end to the second end of the body; and
   the plurality of diodes comprise a first diode, a second diode and a third diode arranged sequentially from the first end to the second end of the body.

5. The photovoltaic junction box of claim 4, further comprising
   a first wire having an end introduced into the first end of the body and electrically connected to the first conduction terminal; and a second wire having an end introduced into the second end of the body and electrically connected to the fourth conduction terminal.

6. The photovoltaic junction box of claim 5, wherein the first wire is soldered or crimped to the first conduction terminal and the second wire is soldered or crimped to the fourth conduction terminal.

7. The photovoltaic junction box of claim 6, wherein a first edge of the first conduction terminal faces the second conduction terminal and a first edge of the second conduction terminal faces the first conduction terminal, the first edge of the first conduction terminal has a first edge segment extending toward the first end of the body and the first edge of the second conduction terminal has a first edge segment extending toward the first end of the body, and the first edge segment of the first conduction terminal and the first edge segment of the second conduction terminal are arranged opposite each other in the widthwise direction of the body.

8. The photovoltaic junction box of claim 7, wherein the anode pin of the first diode is soldered on a border area of the first edge segment of the first conduction terminal and the cathode pad of the first diode is soldered on a border area of the first edge segment of the second conduction terminal.

9. The photovoltaic junction box of claim 8, wherein the first edge of the second conduction terminal extends from the first side of the body to the first end of the body along a curving path.

10. The photovoltaic junction box of claim 9, wherein the first conduction terminal is disposed within an area defined by the first edge of the second conduction terminal, the first side of the body, and the first end of the body.

11. The photovoltaic junction box of claim 10, wherein a first edge of the fourth conduction terminal faces the third conduction terminal and a first edge of the third conduction terminal faces the fourth conduction terminal, the first edge of the fourth conduction terminal has a first edge segment extending toward the second end of the body and the first edge of the third conduction terminal has a first edge segment extending toward the second end of the body, and
   the first edge segment of the fourth conduction terminal and the first edge segment of the third conduction terminal are arranged opposite each other in the widthwise direction of the body.

12. The photovoltaic junction box of claim 11, wherein the anode pin of the third diode is soldered on a border area of the first edge segment of the third conduction terminal and the cathode pad of the third diode is soldered on a border area of the first edge segment of the fourth conduction terminal.

13. The photovoltaic junction box of claim 12, wherein the first edge of the third conduction terminal extends from the first side of the body to the second end of the body along a curving path.

14. The photovoltaic junction box of claim 13, wherein the fourth conduction terminal is disposed within an area defined by the first edge of the third conduction terminal, the first side of the body, and the second end of the body.

15. The photovoltaic junction box of claim 14, wherein a second edge of the second conduction terminal faces the third conduction terminal and a second edge of the third conduction terminal faces the second conduction terminal, and the anode pin of the second diode is soldered on the second edge of the second conduction terminal and the cathode pad of the second diode is soldered on the second edge of the third conduction terminal.

16. The photovoltaic junction box of claim 15, wherein the second edge of the second conduction terminal extends from the first side of the body to the second side of the body along a curving path, and the second edge of the third conduction terminal extends from the first side of the body to the second side of the body along a curving path.

17. The photovoltaic junction box of claim 16, wherein the first diode has an angle of about 90 degrees with respect to the lengthwise direction of the body, the second diode has an angle of about 45 degrees with respect to the lengthwise direction of the body, and the third diode has an angle of about 270 degrees with respect to the lengthwise direction of the body.

18. The photovoltaic junction box of claim 17, wherein the first diode has an angle of about 45 degrees with respect to the second diode, and the second diode has an angle of about 135 degree with respect to the third diode.

19. The photovoltaic junction box of claim 4, wherein a surface area of the third conduction terminal is larger than surface areas of the first, second, and fourth conduction terminals.

20. The photovoltaic junction box of claim 19, wherein the surface area of the third conduction terminal is larger than a surface area of the second conduction terminal, the surface area of the second conduction terminal is larger than a surface area of the fourth conduction terminal, and the surface area of the fourth conduction terminal is larger than a surface area of the first conduction terminal.

* * * * *